United States Patent Office 3,090,538
Patented May 21, 1963

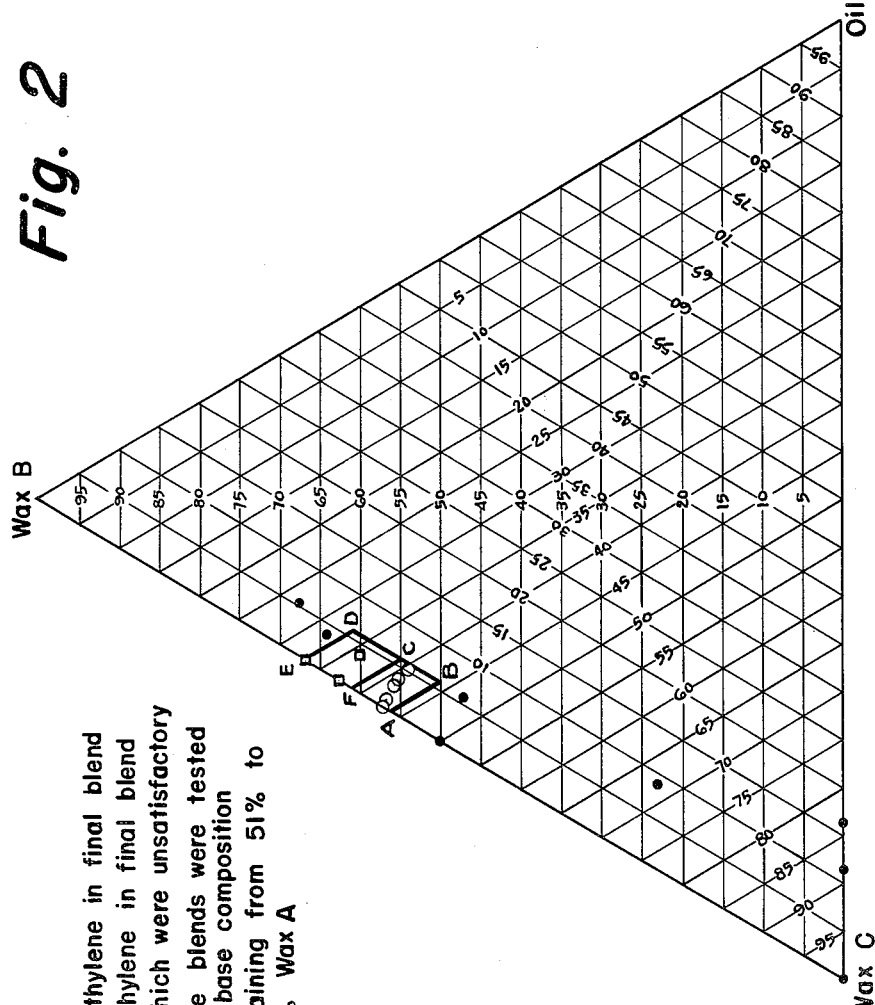

3,090,538
WAX COMPOSITION HAVING NON-FLAKING CHARACTERISTICS FOR USE IN COATING FIBROUS MATERIALS
William J. Stout, Wilmington, Del., assignor to Sun Oil Company, Philadelphia, Pa., a corporation of New Jersey
Filed June 27, 1961, Ser. No. 119,806
22 Claims. (Cl. 229—3.1)

This invention relates to a novel wax composition. It particularly relates to a wax composition containing a major proportion of a specific paraffin wax and minor proportions of a specific microcrystalline wax, another specific paraffin wax, and a specific polyolefin wax, the composition being especially suitable for coating fibrous sheets and containers for packaging liquids. More particularly, it relates to a wax composition having superior non-flaking characteristics, being especially suitable for coating fibrous milk containers. Preferably, the wax composition contains, additionally, a minor proportion of a specific distillate oil.

This application is a continuation-in-part of my co-pending application Serial No. 47,062, filed August 2, 1960, now abandoned.

The use of wax to coat fibrous containers for use in packaging liquids is well known in the art. A particularly useful paraffin wax suitable for coating such containers is described and claimed in U.S. Patent No. 2,624,501. However, actual commercial use has disclosed several disadvantages of coatings formed from this wax. Such coatings on fibrous sheet material may develop minute imperfections which impart a serpentine effect to the coating, thereby creating an unsightly appearance, and leakage of packaged liquid materials through the imperfections may develop. A further difficulty of this wax, as has been found, is the tendency of the coatings formed therefrom to fracture and break away from the fibrous material on suffering an impact so that wax "flakes" are present in the packaged liquid. Such flaking action of a wax is highly undesirable because the product is rendered objectionable to ultimate customers.

An object of the present invention is to provide a wax composition especially suitable for coating fibrous containers for fluids. A particular object is to provide a wax composition effective for coating paper containers for liquids which imparts a pleasing appearance to the resulting article of manufacture while obtaining good coverage and good blocking characteristics and which can be readily applied with conventional equipment. A specific object is to provide a wax composition which, when formed as a coating for a fibrous container, will not easily fracture on impact and will have substantially non-flaking characteristics.

The above and other objects can be obtained by blending the following components having specific properties in specific proportions: a relatively low melting paraffin wax, a relatively high melting paraffin wax, a microcrystalline wax having laminating properties, low molecular weight polyolefin wax, and preferably, a distillate hydrocarbon oil.

As used herein, melting points are determined by ASTM D87–57, penetrations by ASTM D1321–57T, and viscosities (SUS-Saybolt Universal seconds) by ASTM D446–53, unless otherwise stated. All percentages designated herein are weight percent.

FIGURE 2 is a triangular plot indicating the relationship between the concentrations of components which are used for blending the wax of the present invention.

Figure 1:
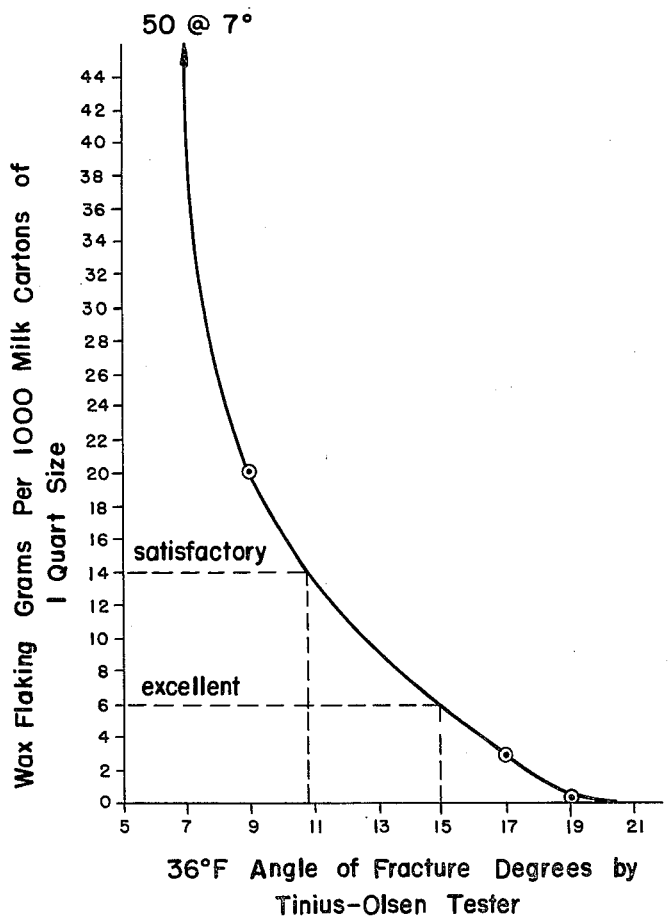
FIGURE 1 is a plot correlating the amount of wax flaking that would be expected for wax compositions having various Tinius-Olsen angles of fracture at 36° F.

The components of the wax composition of the present invention are characterized as follows:

WAX A

This is a relatively low melt point paraffin wax. Typically, it has a melting point of from 125° F. to 132° F., a penetration (at 77° F.) of from 17 to 23, a viscosity (at 210° F.) of from 37 to 41 seconds, and a tensile strength at 40° F. of from 275 p.s.i. to 325 p.s.i., the tensile strength at 40° F. being at least 25 p.s.i. higher than the tensile strength at 70° F. This relatively low melt point paraffin wax may be prepared as follows: A slack wax from the dewaxing of lubricating oil, which may contain about 30% oil, is vacuum distilled nad the fraction distilling between about 390° F. and 565° F. at 2 mm. of mercury pressure is collected. This fraction is dissolved in a solvent, preferably a mixture of methyl ethyl ketone and benzene in about equal volumes. Dissolution is performed at an elevated temperature, from about 165° F. to 195° F. being suitable, and advantageously about 6 parts by volume of solvent per part of wax is used. The solution is slowly cooled to a temperature of from 75° F. to 83° F. and the wax which precipitates at this temperature is separated such as by filtration. The solution separated from the precipitated wax is further slowly cooled to a temperature of from 28° F. to 33° F. and the wax which precipitates at this temperature is separated and forms wax A of the present composition. Preferably, the wax after separation from solution is washed, such as with the solvent employed for dissolution, preferably at the same temperature as used for filtration, namely from 28° F. to 32° F. and the wax is then separated.

An alternate method of preparing wax A of the present invention which provides considerable flexibility in obtaining the desired wax product is to separate from slack wax two distillate fractions, one distilling under vacuum in the range of from about 390° F. to 475° F. at 2 mm. of mercury pressure and a second fraction distilling in the range of from about 450° F. to 565° F. at 2 mm. of mercury pressure. As usually occurs, the initial boiling point of the second fraction will overlap the end point of the first-mentioned distilled fraction. The lower boiling distillate fraction is dissolved in a solvent as above described and the solution is cooled to a temperature of from 25° F. to 31° F. The wax which precipitates at this temperature is separated as by filtering. The higher boiling distillate fraction is dissolved in a solvent as above described, except that a lower proportion of solvent to wax, say about 4.5 parts of solvent per part of wax, is advantageously used, and the solution is slowly cooled to a temperature of from 72° F. to 82° F. The wax which precipitates at this temperature is separated such as by filtering and the remaining solution is further slowly cooled to a temperature of from 25° F. to 31° F. The wax which precipitates at this latter temperature is separated as by filtering. The two distillate waxes so-prepared are combined to form wax A of the present invention. Considerable flexibility is obtained since the blending may be in various proportions so that the properties of the resulting wax mixture can be varied within the limits above-described for wax A. If desired, the two waxes can be washed and dried prior to blending, or the wet waxes may be combined and simultaneously washed and then recovered by removal of the wash liquid. In general, from about 60 to 75% by weight of the paraffin wax will comprise wax from the lower boiling distillate fraction since, as has been found, such mixture gives a wax having properties within those defined for wax A of the invention. It is preferred, however, that wax A comprise 75% lower boiling distillate fraction and 25% higher boiling distillate fraction.

WAX B

This is a relatively high melt point paraffin wax. Typically, it has a melting point of from 148° F. to 154° F., a penetration (at 100° F.) of from 13 to 19, and a viscosity (at 210° F.) of from 40 to 46 seconds. This relatively high melt point paraffin wax can be prepared as follows: A slack wax from the dewaxing of lubricating oil or from topping a high wax content crude oil, is distilled under vacuum, and the fraction distilling in the range of from about 450° F. to 565° F. at 2 mm. of mercury pressure is collected. The distillate fraction is dissolved in a solvent which is preferably a mixture of methyl ethyl ketone and benzene in about equal parts by volume, dissolution advantageously being at a temperature of from about 165° F. to 190° F. as above described, using about 2 parts of solvent per part of wax. The solution is slowly cooled to a temperature of from about 77° F. to 83° F. and the wax precipitated at this temperature is separated. The separated wax is washed such as with the solvent employed for dissolution, preferably at the same temperature as used for filtration, and the wax is recovered. This wax forms wax B of the present invention.

WAX C

This is a microcrystalline wax having laminating properties. Typically, it has a penetration (at 110° F.) of from 60 to 80, preferably 69 to 75, a viscosity (at 210° F.) of from 70 to 79, and an adhesion value of from 30 to 120, preferably between 65 and 85. The wax C may be obtained by any of the methods known to the art. One especially suitable method is described and claimed in U.S. Patent No. 2,783,183. In general, the method of obtaining microcrystalline wax with "laminating" quality is as follows: A slack wax having from about 20 percent to about 50 percent oil is subjected to vacuum distillation to form a plurality of fractions. The desired fraction is dissolved in a hot solvent, such as a mixture of methyl ethyl ketone and benzene, chilled at one desired temperature and the precipitated wax separated by, say, filtration. The filtrate from this first step is further chilled to another desired lower temperature, and the precipitated wax separated and recovered. This sequence is repeated until the desired wax fraction is obtained.

For example, a microcrystalline wax suitable for use in the composition of this invention is prepared as follows: Slack wax containing about 30 percent oil, obtained from the dewaxing of lubricating oils, is continuously vacuum distilled at 650° F. into two distillate fractions, one being removed at about 420° F. at 6 mm. mercury pressure, and the other at about 590° F. at 25 mm. mercury pressure. These low boiling fractions constitute 68 percent of the total charge. The high boiling residual fraction constitutes 32 percent of the total charge and is used for the recovery of the desired microcrystalline wax. This high boiling residual fraction is dissolved in 3.5 parts of a hot (150° F.) solvent mixture comprising 53 percent methyl ethyl ketone and 47 percent benzene. The resulting wax solution is cooled to 93° F., diluted with 5.5 parts of solvent, filtered (or centrifuged) to remove the precipitated wax, and the wax is washed with 4 parts of solvent. The filtrate from the initial filtrations is further cooled to 58° F., diluted with 6 parts of solvent, filtered, and washed with 4 parts of solvent. The wax product finally obtained, after solvent removal has an adhesion value between 30 and 120 grams pull per 2 inch width and is designated herein as wax C.

DISTILLATE OIL

It is desirable in the preparation of the composition of the invention to use a distillate petroleum oil. This oil can be of naphthenic, paraffinic, or aromatic base stock. The oil, generally, will have an API gravity at 60° F. of from about 10.0 to 35.0, a viscosity at 100° F. of from 70 to 3500 seconds and a pour point up to +65° F., maximum. Preferably a solvent refined, paraffinic base, petroleum distillate having a maximum pour point of 0° F. is employed. The zero pour point limitation is preferable in order to prevent the introduction of relatively soft waxes or soft, wax-like materials which, if present, may deleteriously affect the properties of the wax composition. Such solvent refined oil will have an API gravity at 60° F. of from 27.5 to 33, a viscosity at 100° F. of 100 to 650 seconds, and a 0° F. pour point. This oil is designated herein as oil P.

POLYOLEFIN WAX

As used herein, the term "polyolefin wax" is intended to include the following: low molecular weight polyethylene, low molecular weight isotacic (crystalline) polypropylene, and blended atactic (amorphous) polypropylene and low molecular weight polyethylene.

The polyethylene wax, designated herein as PE, has an average number molecular weight between 1000 and 12,000. Further, a suitable PE has a melt point between about 205° F. and 230° F. and a specific gravity between about 0.900 and 0.9300. For example, the PE used herein to illustrate the invention had these properties: average molecular weight, 2000; melt point, 219° F. to 226° F. ((ASTM E28–51T); hardness, 3 to 5 (ASTM D1321–55T); specific gravity about 0.92; and viscosity at 140° C. of about 180 centipoises.

The polypropylene wax, designated herein as PP, has an average number molecular weight between 1000 and 12,000 and is characterized by a high degree of crystallinity. A particularly suitable PP is described and claimed in U.S. Patent No. 2,835,659. However, any commercially available PP which is highly crystalline and within the above specified molecular weight range can be used satisfactorily in this invention. Typically, satisfactory PP has a melt point between about 280° F. and 335° F., a specific gravity between about 0.900 and 0.920, and an average molecular weight between about 7000 and 9000.

It is recognized that propylene and ethylene may be copolymerized to a suitble polyolefin wax and used in the wax composition of the invention or PP and PE can be used concurrently as components of said wax composition, or, preferably, may be used separately and individually as a component in said wax composition.

Another suitable polyolefin wax as specially defined herein is a blend comprising atactic polypropylene, designated as APP, and PE. The APP is the co-product separated from the process which polymerizes propylene to a major proportion of isotactic, i.e., highly crystalline, polypropylene. According to the present invention, the ratio of APP to PE will range from 0.01:1 to 3.0:1. Preferably, the ratio of APP to PE is 1:1. Those skilled in the art will recognize that the term "atactic" is associated with non-crystalline molecular structure and high solubility in normal pentane, normal hexane, or normal heptane. The term also includes a non-crystalline, n-paraffin soluble polymer containing minor amounts of crystalline polymer.

The term "blend" used hereinabove includes: combining APP and PE prior to blending into the wax composition, blending APP first into said wax composition and blending subsequently thereinto the proper amount of PE, blending PE first into said wax composition and blending subsequently thereinto the proper amount of APP, and combinations of the above.

The above-specified components in specific combination make up the wax composition of the present invention. The incorporation of these components into the wax composition can be by any convenient means, such as by blending the waxes in molten state, together with the oil and polymer, to obtain a homogeneous blend.

The solvent designated in the methods of preparing the wax components may be any of the known dewaxing and deoiling solvents. The preferred solvent is a mixture of methyl ethyl ketone and benzene. Either of the components of the solvent may be replaced, however, in whole or in part, by other ketones, such as methyl butyl ketone or acetone, or hydrocarbons or halogenated hydrocarbons such as ethylene dichloride, pentane, and hexane, or alcohols such as propyl or the heptyl alcohols.

The adhesion test used herein for the microcrystalline wax component is performed as follows: Two strips of glassine paper, 2 inches by 6 inches, are laminated with the wax under test by pressing them mildly on a hot plate at a temperature just above the melting point of the wax. The load is adjusted to about 8 pounds of wax per ream of laminate, evenly distributed between the strips. This laminate is held at 73° F. in an atmosphere at 50 percent relative humidity for one hour before testing. Adhesion is the grams pull per 2 inch width required to separate the strips by peeling.

Laminating waxes of the microcrystalline type will have adhesion values, measured as described above, of from 30 to 120. Typical samples of microcrystalline waxes were tested and the following adhesion values were obtained: 35, 49, 59, 62, 74, 84, 89, 99, and 117.

The Tinius-Olsen angle of fracture test used herein to evaluate the flaking properties of waxes is performed on the Tinius-Olsen stiffness tester which has a six pound capacity. The procedure is as follows: Wax is formed into strips of specified dimensions (0.16 inch thick to 0.5 inch wide by 2 inches long) by solidifying molten wax on the surface of water to form the desired thickness, and cutting to the other dimensions. These wax strips are placed in the Tinius-Olsen stiffness tester and are evaluated for angle of fracture at 73° F. and at 36° F. This angle of fracture as measured by this apparatus is the angle at which the specimen fractures. Thus, it is desirable to formulate a wax composition which will, under test, fracture at a high angle of deformation. An angle of 78° is usually the maximum deformation that can be measured on this instrument, although an angle of 90° is theoretically possible. Consequently, as used herein, an angle of 78° should be interpreted as 78°+.

The angle of fracture values at 73° F. and 36° F. are necessary for complete definition of flaking properties of the specimen. However, the angle of fracture at 36° F. is the critical value because this temperature corresponds approximately to the refrigeration temperature to which, say, milk cartons are exposed. The flaking characteristics are evaluated by determining the grams of wax which flake off per 1000 milk cartons of one quart size, after subjecting the milk cartons to the standard drop test. Accordingly, the amount of flaking to be expected from a wax composition has been correlated with the angle of fracture at 36° F. in FIGURE 1.

Actual experience has shown that a wax composition with substantially non-flaking characteristics must have a minimum angle of fracture at 36° F. of 15° and at 73° F. a minimum of 25°. However, satisfactory wax compositions suitable for coating fibrous materials for packaging liquids may have an angle of fracture at 36° F. of 11° minimum, and at 73° F., 20° minimum. The wax composition of the present invention must have Tinius-Olsen angles of fracture within these latter specified values. Note in FIGURE 1 that a wax composition having an angle of fracture at 36° F. of 15° will "flake" only 6 grams of wax per 1000 milk cartons and a wax with an angle of fracture at 36° F. of above 19° will have substantially no wax "flaking." On the other hand, the commercially available waxes of the art, such as the wax described in U.S. Patent No. 2,624,501, will have an angle of fracture at 36° F. of about 7° which represents about 50 grams of wax flaking per 1000 milk cartons of one quart size.

"Non-flaking" as used herein is defined from FIGURE 1 and is, in general, applicable to wax compositions which result in wax flaking from 0 to 14 grams of wax per 1000 milk cartons of one quart size. More particularly, "non-flaking" is applicable to wax compositions having a Tinius-Olsen angle of fracture at 36° F. of from 11° to 78° and at 73° F. of from 20° to 78°.

It is essential for purposes of the present invention that the components be combined in amounts within the following specified ranges:

| Component: | Concentration range (percent) |
|---|---|
| Wax A | 42 to 84.5 |
| Wax B | 5 to 25 |
| Wax C | 5 to 30 |
| Polyolefin wax | 0.5 to 3.0 |
| Oil | 0 to 3 |

The preferred composition for the present invention is:

| Component: | Amount (percent) |
|---|---|
| Wax A | 55 to 68.5 |
| Wax B | 20 to 25 |
| Wax C | 10 to 15 |
| Oil | 0.5 to 3 |
| Polyolefin wax | 1 to 2 |

An excellent example of the wax composition of the invention is a blend of:

| | Percent |
|---|---|
| Wax A | 62 |
| Wax B | 20 |
| Wax C | 15 |
| Oil | 2 |
| Polyethylene | 1 |
| | 100 |

The above wax composition had an angle of fracture at 36° F. of 21° and at 73° F. of 31°, which according to FIGURE 1 is equivalent to essentially no wax flaking per 1000 milk cartons.

As herein defined, a wax composition designated either expressly or by omission as containing "zero" oil content includes, inherently or additionally, an oil content of less than 0.5%.

Another method of demonstrating the criticality of the concentration of components is shown in FIGURE 2. Typically, the present wax composition contains 51% to 84% wax A and usually from 1% to 2% of polyolefin wax. Therefore, the dependence of the other three components can be shown on a triangular plot as in FIGURE 2. This figure shows that the ratio of the amounts of these three components which can be blended with the base composition of wax A and polyolefin to produce satisfactory non-flaking wax is confined within the area ABCDEF. All blends outside of this area, as indicated by dots on the diagram of FIGURE 2, were found to be unsatisfactory. Furthermore, if the base composition contains the equivalent of 1% polyolefin, the ratio of the other components is confined to area ABCF. And, still further, if the base composition contains the equivalent of 2% polyolefin, satisfactory non-flaking wax can only be blended from proportions of the other three components within the area CDEF.

Therefore, from FIGURE 2, it is apparent that the wax composition of the invention comprises essentially from 14% to 47% of blended wax comprising essentially from 33% to 44% of laminating microcrystalline wax (wax C), from 50% to 67% of relatively high melt point paraffin wax (wax B), and from 0% to 6% of distillate hydrocarbon oil; from 51% to 84% of relatively low melt point wax (wax A), and from 1% to 2% polyolefin wax. The above composition has a Tinius-Olsen angle of fracture at 36° F. of from 11° to 21° and at 73° F. of from 20° to 78°.

To further show the criticality of component concentration, the following illustrations are presented. In considering these examples, it should be remembered that a wax composition which results in satisfactory flaking characteristics will have a Tinius-Olsen angle of fracture at 36° F. of 11° minimum and at 73° F. of 20° minimum. The preferred angles of fracture are: at 36° F., 15° minimum; and at 73° F., 25° minimum.

*Example 1*

A commercially available polyethylene wax having typical properties as disclosed hereinabove was blended into molten wax A. Upon solidifying and testing, the following results were obtained:

| Wax A | PE | Angle of fracture | |
|---|---|---|---|
| | | 73° F. | 36° F. |
| 100 | 0 | 7 | 5 |
| 99 | 1 | 8 | 5 |
| 98 | 2 | 16 | 7 |
| 97.5 | 2.5 | 11 | 6 |

The optimum concentration appears to be 2% polyethylene but none of the blends are of satisfactory quality. It is thus concluded that a polyolefin blended with only wax A does not produce a substantially non-flaking wax. However, it is noticed that 2.5% polyethylene can be used to obtain an increase in the 36° F. and 73° F. angle of fracture rating and, therefore, 3.0° polyethylene could be used with no apparent detriment.

*Example 2*

The following blends illustrate the fact that a polyolefin (polyethylene, PE) plus a laminating microcrystalline wax (wax C) blended with wax A does not produce a substantially non-flaking wax.

| Wax A | Pe | Wax C | Angle of fracture | |
|---|---|---|---|---|
| | | | 73° F. | 36° F. |
| 88 | 2 | 10 | 13 | 8 |
| 83 | 2 | 15 | 13 | 8 |

By comparing with Example 1, it is noticed that the microcrystalline wax component tends to lower the 73° F. angle of fracture and tends to raise the 36° F. angle of fracture.

*Example 3*

These blends indicate that a higher melt point paraffin wax (wax B) is necessary before a substantially non-flaking wax is produced.

| Wax A | PE | Wax C | Wax B | Angle of fracture | |
|---|---|---|---|---|---|
| | | | | 73° F. | 36° F. |
| 78 | 2 | 15 | 5 | 78 | 12 |
| 68 | 2 | 15 | 15 | 78 | 10 |
| 58 | 2 | 15 | 15 | 78 | 11 |
| 53 | 2 | 15 | 30 | 78 | 13 |

Referring to FIGURE 1, it is noted that three out of the above four blends are in the satisfactory range for flaking properties. By comparing with Example 2, it is noticed that there was a substantial improvement in the angle of fracture at 73° F. (from about 13° to 78°) and a significant increase in the angle of fracture at 36° F. (from 8° to about 11°), which improvement can be contributed to the specific quantities of the relatively high melt point paraffin wax.

*Example 4*

The benefit obtained by the inclusions of a small amount of a specific distillate oil is illustrated in the following blends. A petroleum oil having a viscosity of 500 SUS at 100° F., 29.6° API, and 0° F. pour point was blended into a mixture of wax A, wax B, wax C, and polyethylene wax having an average molecular weight of 2000 with the following results:

| Wax A | PE | Wax C | Wax B | Oil P | Angle of fracture | |
|---|---|---|---|---|---|---|
| | | | | | 73° F. | 36° F. |
| 76 | 2 | 15 | 5 | 2 | 19 | 17 |
| 66 | 2 | 15 | 15 | 2 | 16 | 15 |
| 56 | 2 | 15 | 25 | 2 | 23 | 16 |
| 51 | 2 | 15 | 30 | 2 | 16 | 14 |

It is noted that all blends have significant improvement in the 36° F. angle of fracture when compared to the previous examples. In fact, the blend containing 56% wax A meets the requirements of a satisfactory non-flaking wax and is only marginally short of being an excellent non-flaking wax. It is concluded that the presence of 2% distillate oil is desirable for consistently high values of 36° F. angle of fracture.

*Example 5*

The following blends indicate the effect of oil content on "flaking" while using only 1% polyethylene rather than 2% polyethylene as used in the previous examples.

| Wax A | PE | Wax C | Wax B | Oil P | Angle of fracture | |
|---|---|---|---|---|---|---|
| | | | | | 73° F. | 36° F. |
| 64 | 1 | 15 | 20 | 0 | 78 | 12 |
| 63.5 | 1 | 15 | 20 | 0.5 | 78 | 14 |
| 63 | 1 | 15 | 20 | 1 | 78 | 15 |
| 62.5 | 1 | 15 | 20 | 1.5 | 35 | 16 |
| 62 | 1 | 15 | 20 | 2 | 31 | 21 |
| 61 | 1 | 15 | 20 | 3 | ¹ 20 | ¹ 23 |

¹ Extrapolated.

The 2% oil blend is an excellent non-flaking wax. Note that the 21° angle of fracture at 36° F. by FIGURE 1, is equivalent to essentially no grams of wax flaking per 1000 milk cartons. Note also that the first blend contained no oil and tested within the satisfactory range for flaking properties. However, it can be concluded from Examples 4 and 5 that 1% to 2% distillate oil is essential for formulating a wax with excellent non-flaking properties, i.e., a wax testing not more than 6 grams of wax per 1000 milk cartons of one quart size. Moreover, it is concluded that 0.5% to 3% oil P should be used in formulating a wax with satisfactory flaking properties, i.e., a wax testing not more than 14 grams of wax per 1000 milk cartons of one quart size.

*Example 6*

The following blend indicates that the presence of the polyolefin is necesary to provide the benefits of the wax composition of the invention. The 2% oil P blend from Example 5 was re-formulated without PE.

| Wax A | PE | Wax C | Wax B | Oil P | Angle of fracture | |
|---|---|---|---|---|---|---|
| | | | | | 73° F. | 36° F. |
| 63 | 0 | 15 | 20 | 2 | 10 | 8 |

The above wax composition does not have the requisite angle of fracture values and is, therefore, unsatisfactory as a non-flaking wax composition. Thus, it is concluded that the polyolefin wax is essential for satisfactory non-flaking properties.

*Example 7*

As hereinabove described, wax A, prepared by said alternate method, is a blend of two distillate wax fractions. As specified, wax A, in general, will consist of from 60% to 75% by weight of the lower boiling distillate fraction. The following blends indicate the effect on flaking characteristics of varying the composition of wax A:

| Wax A | | PE | Wax C | Wax B | Oil P | Angle of fracture | |
|---|---|---|---|---|---|---|---|
| Low boiling component | High boiling component | | | | | 73° F. | 36° F. |
| 75 | 25 | 1 | 15 | 20 | 2 | 33 | 19 |
| 70 | 30 | 1 | 15 | 20 | 2 | 57 | 19 |
| 60 | 40 | 1 | 15 | 20 | 2 | 76 | 18 |
| 70 | 30 | 1 | 10 | 20 | 2 | 41 | 15 |
| 60 | 40 | 1 | 10 | 20 | 2 | 14 | 9 |

It is noted that the composition of wax A can vary between 60% and 75% of the low boiling component if the final composition contains at least 15% wax C. For blends containing only 10% wax C, it is necessary to have wax A composed of 70% to 75% of the low boiling distillate fraction in order to produce a wax composition having satisfactory non-flaking properties. Note also that each blend except the last one is an excellent non-flaking wax composition.

*Example 8*

The benefit obtained by blending atactic polypropylene with low molecular weight polyethylene and substituting such blend for PE is demonstrated as follows:

| PE | APP | Wax A | Wax B | Wax C | Oil P | Angle of Fracture | |
|---|---|---|---|---|---|---|---|
| | | | | | | 73° F. | 36° F. |
| 1 | 0 | 64 | 20 | 15 | 0 | 78 | 12 |
| 1 | 1 | 63 | 20 | 15 | 0 | 42 | 15 |
| 1 | 0 | 62 | 20 | 15 | 2 | 26 | 18 |
| 1 | 1 | 61 | 20 | 15 | 2 | 38 | 33 |

The last blend is a remarkably superior non-flaking wax. Note that the 33° angle of fracture at 36° F., by FIGURE 1, far exceeds the 21° angle which is equivalent to essentially no grams of wax flaking per 1000 milk cartons. This means that such wax composition would have essentially non-flaking properties even at below freezing temperatures.

In the above examples, wax C has been shown in amounts of 10%–15% of the blend. Actually, wax C can be present in amounts ranging up to about 50% without adversely affecting the Tinius-Olsen values of the blend. However, it has been found that a composition of the present invention containing greater than 30% wax C when used to coat milk cartons causes the cartons to stick or adhere to the packaging equipment. Thus, the non-flaking wax compositions of the present invention should contain no more than 30% wax C in order to be commercially acceptable.

From the above data, a wax composition having non-flaking characteristics will comprise essentially from 42% to 84.5% of relatively low melt point wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 5% to 25% of relatively high melt point paraffin wax having a melt point between 148° F. and 154° F., viscosity at 210° F. of from 40 to 46 seconds, and a penetration at 100° F. of from 13 to 19; from 5% to 30% microcrystalline wax having a penetration at 110° F. of from 60 to 80, viscosity at 210° F. of from 70 to 79 seconds, and an adhesion value of from 30 to 120; and from 0.5% to 3.0% polyolefin wax selected from the group consisting of polypropylene, polyethylene, and a blend comprising atactic polypropylene and low molecular weight polyethylene; said wax composition having a Tinius-Olsen angle of fracture at 36° F. of at least 11° and at 73° F. of at least 20°. Further, the above wax composition may have additionally the equivalent of from 0.5% to 3% hydrocarbon oil having an API gravity at 60° F. of from 10.0 to 35.0, viscosity at 100° F. of from 70 to 3500 seconds, and a pour point up to 65° F.

On storing wax slabs prepared from the compositions of the present invention for long periods of time under ambient temperature conditions, which includes a temperature of about 90° F., no blocking of the slabs is observed.

The present wax composition is primarily intended for use in coating fibrous fluid containers, particularly cardboard milk containers, which may be advantageously accomplished by dipping or spraying the containers in or with molten wax. The present wax composition may be used in many other applications, especially where high tensile strength and low temperature flexibility and adherence is desirable, such as in the coating of metal fluid containers, canvas impregnation, coating paper drinking cups, etc.

Furthermore, it is recognized that the wax composition of the present invention may have added thereto various additives, such as anti-oxidants in amounts ranging from .0015% to 2%. Certain amides may also be incorporated to, for example, reduce frictional drag of a wax coated milk carton moving through conventional packaging equipment.

I claim:

1. A wax composition with non-flaking characteristics having a Tinius-Olsen angle of fracture at 36° F. of at least 11° and at 73° F. of at least 20°, and comprising essentially a major proportion of a relatively low melt point paraffin wax and minor proportions of laminating microcrystalline wax, relatively high melt point paraffin wax, and polyolefin wax selected from the group consisting of low molecular weight polypropylene, low molecular weight polyethylene, and a blend comprising atactic polypropylene and low molecular weight polyethylene.

2. A wax composition according to claim 1 containing additionally from 0.5 to 3.0 percent distillate petroleum oil having a viscosity at 100° F. of from 70 to 3500 seconds.

3. A wax composition according to claim 2 wherein said Tinius-Olsen angle of fracture at 36° F. is at least 15°.

4. A wax composition according to claim 2 wherein said polyolefin wax is polyethylene.

5. A wax composition according to claim 2 wherein said polyolefin wax is a blend comprising atactic polypropylene and low molecular weight polyethylene.

6. A wax composition comprising essentially from 42% to 84.5% of relatively low melt point paraffin wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 5% to 25% relatively high melt point paraffin wax having a melt point between 148° F. and 154° F., viscosity at 210° F. of from 40 to 46 seconds, and a penetration at 100° F. of from 13 to 19; from 5% to 30% microcrystalline wax having a penetration at 110° F. of from 60 to 80, a viscosity at 210° F. of from 70 to 79 seconds, and an adhesion value of from 30 to 120; and from 0.5% to 3.0% polyolefin wax selected from the group consisting of polypropylene, polyethylene, and a blend comprising atactic polypropylene and low molecular weight polyethylene; said wax composition having a Tinius-Olsen angle of fracture at 36° F. of at least 11° and at 73° F. of at least 20°.

7. A wax composition according to claim 6 wherein said polyolefin wax is polyethylene.

8. A wax composition according to claim 6 wherein said polyolefin wax is a blend comprising atactic polypropylene and low molecular weight polyethylene.

9. A wax composition according to claim 6 containing additionally from 0.5 to 3.0% distillate petroleum oil having a viscosity at 100° F. of from 70 to 3500 seconds.

10. A wax composition according to claim 9 wherein said polyolefin wax is polyethylene.

11. A wax composition according to claim 9 wherein said polyolefin wax is a blend comprising atactic polypropylene and low molecular weight polyethylene.

12. A wax composition with non-flaking characteristics comprising essentially from 14% to 47% of blended wax comprising essentially from 33% to 44% of laminating microcrystalline wax, from 50% to 67% of relatively high melt point paraffin wax, and from 0% to 6% of hydrocarbon oil having a viscosity at 100° F. of from 100 to 650 seconds; from 51% to 84% of relatively low melt point paraffin wax, and from 1% to 2% polyolefin wax selected from the group consisting of low molecular weight polypropylene and low molecular weight polyethylene; said wax composition having a Tinius-Olsen angle of fracture at 36° F. of from 11° to 21° and at 73° F. of from 20° to 78°.

13. A wax composition according to claim 12 wherein said polyolefin wax is low molecular weight polyethylene.

14. A wax composition according to claim 12 wherein said Tinius-Olsen angle of fracture at 36° F. is from 15° to 21°.

15. A container for packaging liquid formed from a fibrous sheet material and provided with an adherent non-flaking moisture resistant coating, said coating being a hydrocarbon composition comprising essentially from 42% to 84.5% of relatively low melt point paraffin wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 5% to 25% relatively high melt point paraffin wax having a melt point between 148° F. and 154° F., viscosity at 210° F. of from 40 to 46 seconds, and a penetration at 100° F. of from 13 to 19; from 5% to 30% microcrystalline wax having a penetration at 110° F. of from 60 to 80, a viscosity at 210° F. of from 70 to 79 seconds, and an adhesion value of from 30 to 120; and from 0.5% to 3.0% polyolefin wax selected from the group consisting of low molecular weight polypropylene, low molecular weight polyethylene, and a blend comprising atactic polypropylene and low molecular weight polyethylene; said wax composition having a Tinius-Olsen angle of fracture at 36° F. of at least 11° and at 73° F. of at least 20°.

16. A container according to claim 15 wherein said polyolefin wax is polyethylene.

17. A container according to claim 15 wherein said polyolefin wax is a blend comprising atactic polypropylene and low molecular weight polyethylene.

18. A container according to claim 15 wherein said coating contains additionally from 0.5 to 3.0% hydrocarbon oil having a viscosity at 100° F. of from 100 to 650 seconds.

19. A container according to claim 18 wherein said polyolefin wax is polyethylene.

20. A container according to claim 18 wherein said polyolefin wax is a blend comprising atactic polypropylene and low molecular weight polyethylene.

21. A container for packaging milk formed from a fibrous sheet material and provided with an adherent non-flaking moisture resistant coating, said coating being a hydrocarbon composition comprising essentially from 14% to 47% of blended wax comprising essentially from 33% to 44% of laminating microcrystalline wax, from 50% to 67% of relatively high melt point paraffin wax and from 0% to 6% of hydrocarbon oil having a Saybolt viscosity at 100° F. of from 100 to 650 seconds; from 51% to 84% of relatively low melt point paraffin wax, and from 1% to 2% polyolefin wax having an average molecular weight between 1000 and 12,000 selected from the group consisting of polypropylene and polyethylene; said wax composition having a Tinius-Olsen angle of fracture at 36° F. of from 11° to 21° and at 73° F. of from 20° to 78°.

22. A container according to claim 16 wherein said polyolefin wax is polyethylene.

References Cited in the file of this patent

UNITED STATES PATENTS

| | | |
|---|---|---|
| 2,773,812 | Tench | Dec. 11, 1956 |
| 2,885,341 | Tench et al. | May 5, 1959 |
| 2,911,384 | Thompson et al. | Nov. 3, 1959 |
| 2,943,991 | Tench et al. | July 5, 1960 |
| 2,988,528 | Tench et al. | June 13, 1961 |

FOREIGN PATENTS

| | | |
|---|---|---|
| 205,515 | Austria | Oct. 10, 1959 |
| 852,432 | Great Britain | Oct. 26, 1960 |